(12) United States Patent
Ziolkowski

(10) Patent No.: US 8,063,642 B2
(45) Date of Patent: *Nov. 22, 2011

(54) METHOD FOR SUBSURFACE ELECTROMAGNETIC SURVEYING USING TWO OR MORE SIMULTANEOUSLY ACTUATED ELECTROMAGNETIC SOURCES

(75) Inventor: Antoni Marjan Ziolkowski, Edinburgh (GB)

(73) Assignee: MTEM Ltd, Edinburgh (GB)

( * ) Notice: Subject to any disclaimer, the term of this patent is extended or adjusted under 35 U.S.C. 154(b) by 802 days.

This patent is subject to a terminal disclaimer.

(21) Appl. No.: 12/157,471

(22) Filed: Jun. 11, 2008

(65) Prior Publication Data

US 2009/0309599 A1    Dec. 17, 2009

(51) Int. Cl.
G01V 3/15 (2006.01)
G01V 3/08 (2006.01)
G01V 3/18 (2006.01)

(52) U.S. Cl. ......... 324/365; 324/334; 324/335; 324/337

(58) Field of Classification Search .......... 324/334–335, 324/337, 365
See application file for complete search history.

(56) References Cited

U.S. PATENT DOCUMENTS

| | | |
|---|---|---|
| 2,293,024 A | 8/1942 | Klipsch |
| 2,531,088 A | 11/1950 | Thompson |
| 2,839,721 A | 6/1958 | De Witte |
| 2,872,638 A | 2/1959 | Jones |
| 3,052,836 A | 9/1962 | Postma |
| 3,113,265 A | 12/1963 | Woods et al. |
| 3,182,250 A | 5/1965 | Mayes |
| 3,329,929 A | 7/1967 | Burnett |
| 3,514,693 A | 5/1970 | Cagniard |
| 3,525,037 A | 8/1970 | Madden et al. |
| 3,967,190 A | 6/1976 | Zonge |
| 4,041,372 A | 8/1977 | Miller et al. |
| 4,047,098 A | 9/1977 | Duroux |
| 4,070,612 A | 1/1978 | McNeill et al. |
| 4,298,840 A | 11/1981 | Bischoff et al. |
| 4,535,293 A | 8/1985 | Rocroi |
| 4,617,518 A | 10/1986 | Srnka |
| 6,914,433 B2 | 7/2005 | Wright et al. |
| 7,023,213 B2 | 4/2006 | Nichols |
| 7,126,338 B2 | 10/2006 | MacGregor et al. |
| 7,277,806 B2 | 10/2007 | Lu et al. |

(Continued)

FOREIGN PATENT DOCUMENTS

WO    WO 03/023452    3/2003

(Continued)

OTHER PUBLICATIONS

A. Ziolkowski, B.A. Hobbs, "Multitransient electromagnetic demonstration survey in France", 2007, Geophysics, vol. 72, pp. F197-F209.

(Continued)

Primary Examiner — Bot Ledynh (57) ABSTRACT

A method for electromagnetic exploration includes imparting a first electromagnetic signal into subsurface formations from a first location and imparting a second electromagnetic signal into the formations from a second location substantially contemporaneously with imparting the first electromagnetic signal. The first and second electromagnetic signals are substantially uncorrelated with each other. A combined electromagnetic response of the formations to the first and second imparted electromagnetic signals is detected at a third location. A response of the formations to each of the first and the second imparted signals is determined from the detected response.

13 Claims, 4 Drawing Sheets

U.S. PATENT DOCUMENTS

| | | | |
|---|---|---|---|
| 7,428,120 B2 * | 9/2008 | Berman et al. | 360/77.01 |
| 7,446,535 B1 | 11/2008 | Tenghamn et al. | |
| 7,657,391 B2 | 2/2010 | Alumbaugh et al. | |
| 7,822,562 B2 | 10/2010 | Dennis | |
| 2003/0151401 A1 * | 8/2003 | Flament et al. | 324/207.11 |
| 2005/0237063 A1 | 10/2005 | Wright et al. | |
| 2006/0038570 A1 * | 2/2006 | Constable | 324/334 |
| 2006/0203613 A1 | 9/2006 | Thomsen | |
| 2008/0071709 A1 * | 3/2008 | Strack | 706/20 |
| 2009/0072831 A1 | 3/2009 | Summerfield et al. | |
| 2009/0216454 A1 | 8/2009 | Ziolkowski et al. | |
| 2009/0230970 A1 | 9/2009 | Ziolkowski | |
| 2009/0309599 A1 | 12/2009 | Ziolkowski | |
| 2010/0013486 A1 | 1/2010 | Ziolkowski et al. | |
| 2010/0017133 A1 | 1/2010 | Ziolkowski et al. | |
| 2010/0017156 A1 | 1/2010 | Ziolkowski et al. | |
| 2010/0057366 A1 | 3/2010 | Wright et al. | |
| 2010/0090701 A1 | 4/2010 | Ziolkowski | |
| 2010/0134110 A1 | 6/2010 | Ziolkowski | |
| 2010/0271032 A1 | 10/2010 | Helwig | |

FOREIGN PATENT DOCUMENTS

| | | |
|---|---|---|
| WO | 2006114561 A2 | 11/2006 |
| WO | 2007017657 A1 | 2/2007 |
| WO | 2007104949 A1 | 9/2007 |
| WO | 2008023174 A2 | 2/2008 |
| WO | 2008023194 A2 | 2/2008 |
| WO | 2008099151 A2 | 8/2008 |

OTHER PUBLICATIONS

D.V. Sarwate, M.B. Pursley, "Crosscorrelation properties of pseudo-random and related sequences", 1980, Proceedings of the IEEE, vol. 68, pp. 593-619.

Sep. 27, 2010, PCT International Search Report.

Wright D et al: "Suppression of noise in MTEM data", SEG Expanded Abstracts 26, 549(2007), San Antonio, TX, Jan. 1, 2007.

A. Ziolkowski, "Developments in the Transient Electromagnetic Method", 2007, First Break, vol. 25, pp. 99-106.

A. Ziolkowski, D. Wright, G. Hall, C. Clarke, "First Shallow-Water Multitransient EM Survey", Jan. 30-31, 2008, Expanded Abstracts, Geophysical Seminar, Petroleum Exploration Society of Great Britain, pp. 146-149, London.

Dr. M. H. Loke, Electrical Imaging Surveys for Environmental and Engineering Studies, A Practical Guide to 2-D and 3-D Surveys, 1997-2001.

S. E. Johansen, H. E. F. Amundsen, T. Rosten, S. Ellingsrud, T. Eidesmo and A. H. Bhuyian, Subsurface Hydrocarbons Detected by Electromagnetic Sounding, First Break, Mar. 2005, vol. 23, European Association of Geoscientists & Engineers.

Anton Ziolkowski and David Wright, Removal of the Air Wave in Shallow Marine Transient EM Data, 2007.

* cited by examiner

METHOD FOR SUBSURFACE ELECTROMAGNETIC SURVEYING USING TWO OR MORE SIMULTANEOUSLY ACTUATED ELECTROMAGNETIC SOURCES

CROSS REFERENCE TO RELATED APPLICATION

Not Applicable

STATEMENT REGARDING FEDERALLY SPONSORED RESEARCH AND DEVELOPMENT

Not Applicable

BACKGROUND OF THE INVENTION

1. Field of the Invention

The invention is related to systems and methods for estimating the response of rock formations in the earth's subsurface to imparted electromagnetic fields in order to determine spatial distribution of electrical properties of the formations.

2. Description of the Related Art

Porous subsurface sedimentary rock formations are typically saturated with fluids as a result of having been deposited in a body of water during sedimentation. As a result, the fluids were initially entirely water. In some subsurface formations the water in the pore spaces has been displaced to some extent after sedimentation by hydrocarbons such as oil and gas. Thus, in some present day subsurface formations, the fluids in their pore spaces may be water, gas or oil, or mixtures of the foregoing.

Detection of formations having less than fully water-saturated pore space, that is, when oil or gas is present in the pore spaces, is of significant economic interest. Certain techniques for detection of such formations include determining existence of electrical resistivities in the subsurface that are anomalously high. The principle of such detection is based on the fact that the flow of electric current through a porous rock formation is related to the fractional volume of the pore spaces with respect to the total rock volume, the spatial configuration of the pore spaces and the electrical properties of the fluids filling the pore spaces. Brine-saturated porous rock formations, for example, are typically much less resistive than the same rock formations having hydrocarbons in some or all of the pore spaces, because brine is a relatively good electrical conductor while hydrocarbons are typically good electrical insulators.

Various techniques for measuring the electrical resistivity of subsurface rock formations are known in the art, for example, time domain electromagnetic survey techniques such as described in International Patent Application Publication No. WO 03/023452. Such techniques in general include imparting an electromagnetic field into the subsurface formations and measuring electric and/or magnetic fields induced in the subsurface formation in response to the imparted electromagnetic field. For such measurement techniques, the electromagnetic field may be imparted using an electric field transmitter, for example, by passing an electric current through a dipole electrode pair. Alternatively a magnetic field transmitter may be used, for example, passing an electric current through a wire loop or a plurality of such loops. The receivers used to detect the responsive electromagnetic fields may be dipole electrode pairs for measuring potential differences (electric field potential), or may be wire loops, pluralities of wire loops or magnetometers for measuring magnetic field amplitude and/or the time derivatives of magnetic field amplitude. The electric current used to impart the electromagnetic field may be controlled to provide a step change in the current. Step change in the transmitter current induces what are referred to as "transient" electromagnetic fields, and the responses measured by the receivers are related to transient response of the formations in the earth's subsurface. Step change in the transmitter current may be obtained by switching the current on, switching the current off, reversing polarity, or combinations of the foregoing. A particularly advantageous form of transmitter current switching configuration used to impart the electromagnetic field is a so called "pseudo-random binary sequence" (PRBS).

In surveying an area of the subsurface using electromagnetic techniques, it is desirable to obtain signals corresponding to various distances ("offsets") between the transmitter and receiver. In a typical survey implementation using PBRS transmitter current switching, a different bandwidth PRBS can be used for different ranges of offset. In one such example, for surveying formations below the bottom of a body of water, a receiver vessel may deploy a plurality of receivers in a selected pattern, such as a line array, on the water bottom. A separate transmitter vessel may deploy the transmitter on or at a nominal distance from the water bottom. The transmitter may be actuated and signals from the receivers recorded. Electromagnetic signals corresponding to various offsets may be obtained by moving the transmitter vessel, actuating the transmitter, and recording signals from the receivers, successively. The transmitter current is measured during actuation and the measurements thereof can then be transmitted to the receiver vessel for data quality control and processing.

To survey different areas of the earth's subsurface below the water bottom, the receiver vessel may withdraw the receivers from the water bottom, move to a different location, and once again deploy the receivers on the water bottom in a different location. The above-described transmitter deployment, transmitter actuation and signal recording may then be repeated.

It is desirable to improve efficiency with which electromagnetic signals are obtained. One possibility is to actuate more than one transmitter at approximately the same time, and record the signals generated in response. Such technique could reduce the time taken to acquire a plurality of different offset electromagnetic signals.

SUMMARY OF THE INVENTION

A method for electromagnetic exploration according to one aspect of the invention includes imparting a first electromagnetic signal into subsurface formations from a first location and imparting a second electromagnetic signal into the formations from a second location substantially contemporaneously with imparting the first electromagnetic signal. The first and second electromagnetic signals are substantially uncorrelated with each other. A combined electromagnetic response of the formations to the first and second imparted electromagnetic signals is detected at a third location. A response of the formations to each of the first and the second imparted signals is determined from the detected response.

Another aspect of the invention is a method for determining a formation response from a detected electromagnetic signal resulting from a first electromagnetic signal imparted into a subsurface earth formation at a first location and from a second electromagnetic signal imparted into the formation at a second location. The first and second signals are imparted substantially contemporaneously. A method according to this aspect of the invention includes (a) deconvolving the detected signal using the first electromagnetic signal; (b) estimating the formation response to the first electromagnetic signal using the deconvolved detected signal; (c) convolving the estimated formation response from (b) with the first electromagnetic signal, and (d) subtracting a result of the convolution of the estimated formation response with the first electromagnetic signal from the detected signal.

Other aspects and advantages of the invention will become apparent from the description and the claims that follow.

DETAILED DESCRIPTION

The description which follows will include a general explanation of the principles of transient controlled source electromagnetic surveying, including an example acquisition system. Following such explanation will be a description of an example implementation of the invention.

Figure 1:
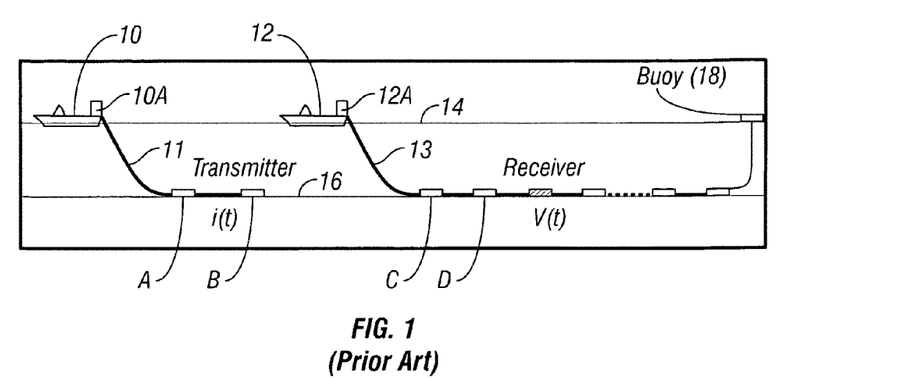
FIG. 1 shows a typical arrangement of electromagnetic transmitter and receivers.

A typical deployment of marine geophysical survey vessels that may be used to conduct electromagnetic geophysical surveying is shown schematically in FIG. 1. A transmitter vessel 10 is deployed on the surface of a body of water 14 such as a lake or the ocean. The transmitter vessel 10 may deploy one or more electromagnetic transmitters 11 into the water 14, typically near the water bottom 16. In the example shown in FIG. 1, the transmitter 11 may be electrodes A, B disposed along an insulated electrical cable. The electrodes A, B are disposed at a selected distance from each other and are coupled to a control and power supply system 10A disposed on the transmitter vessel 10. A receiver vessel 12 may also be deployed on the water 14 proximate the transmitter vessel 10. The receiver vessel 12 may deploy one or more electromagnetic receivers 13 in the water 14, typically on the water bottom 16. In the example of FIG. 1, the receiver 13 may be a plurality of electrodes C, D disposed along an insulated electrical cable. The electrodes C, D may be configured to detect voltages resulting from electromagnetic fields induced in the subsurface by the transmitter 11 being energized. The voltages imparted across the electrodes C, D. may be detected by a recording system 12A disposed on the receiver vessel 12, or may be communicated for storage in a recording buoy 18 at a distal end of the receiver cable.

Actuation of the transmitter 11 is performed by imparting electric current across the transmitter electrodes A, B. The system shown in FIG. 1 includes transmitter and receivers referred to as horizontal electric dipoles. It will be appreciated by those skilled in the art that any other known form of electromagnetic transmitter and receiver, for example, vertical electric dipoles (pairs of electrodes oriented vertically), horizontal magnetic dipoles (wire coils oriented so that the longitudinal axis of the coils is horizontal) and vertical magnetic dipoles (the vertical magnetic analog of the vertical electric dipole) may be used in other examples, as well as magnetometers for detection of magnetic fields. The foregoing example of acquisition system used in a marine environment is provided only to illustrate acquisition of electromagnetic survey data. Methods according to the invention can be used in electromagnetic surveys conducted on land, and the invention is not limited to use with marine surveys.

In performing a method according to the invention, both the received signal amplitude and the electric current used to induce the electromagnetic field at the transmitter are measured essentially simultaneously, and the impulse response of the subsurface formations located below the transmitter and the receiver may be recovered from such measurements by deconvolution. The particular implementation of deconvolution will be further explained below. A general explanation of deconvolution as used in electromagnetic surveying is disclosed in the WO 03/023452 publication referred to above. Other publications explaining acquisition and deconvolution processing of electromagnetic survey signals include: Ziolkowski, A., Hobbs, B. A., and Wright, D., 2007, *Multi-transient electromagnetic demonstration survey in France*, Geophysics, 72, F197-F209; Ziolkowski, A., 2007, *Developments in the transient electromagnetic method*, First Break, 25, 99-106; Ziolkowski, A., Wright, D., Hall, G. and Clarke, C., 2008, *First shallow-water multitransient EM survey*, Expanded Abstracts, Geophysical Seminar, London, 30-31 Jan. 2008, Petroleum Exploration Society of Great Britain.

A transient-switched electric current, typically a finite-length signal such as a pseudo-random binary sequence (PRBS), is applied across the transmitter electrodes A and B to induce an electromagnetic field in the subsurface. The voltage induced across each pair of receiver electrodes, for example, C and D in FIG. 1, is measured simultaneously. The induced voltage will be at least in part induced by electromagnetic fields generated in the subsurface in response to the field imparted by the transmitter. If, after the end of the PBRS the measured voltage across the receiver electrodes C, D substantially reaches a steady state before the next PBRS is applied across the transmitter electrodes A, B, a substantially complete response of the formations in the subsurface to the imparted electromagnetic field has been measured and such response can be represented by the expression:

$$v_{CD}(t) = \Delta x_s \Delta x_r i_{AB}(t) * g_{CD;AB}(t) + n_{CD}(t) \quad (1)$$

where $v_{CD}(t)$ is the voltage measured across the receiver electrodes C, D with respect to time, $i_{AB}(t)$ is the current applied across the transmitter electrodes A, B with respect to time, $g_{CD;AB}(t)$ is the impulse response of the subsurface formations, the asterisk * denotes convolution, and $n_{CD}(t)$ is the noise at the receiver electrodes C, D with respect to time. $\Delta x_s$ and $\Delta x_r$ are the in-line lengths of the transmitter and receiver dipoles, respectively (i.e., the respective spacing between A and B and C and D). If a magnetic field transmitter or receiver is used instead of a dipole electric transmitter and receiver, an equivalent expression for the magnetic dipole moment may be substituted in equation (1) for $\Delta x_s$ and $\Delta x_r$.

It has been determined from experience in using systems such as shown in FIG. 1 that transmitter to receiver distances ("offsets"), represented by r, within a range of about $2d \leq r \leq 4d$ are required to resolve the resistivity of a particular ("target") formation disposed at a depth d below the water bottom 16 (or the surface of the earth in land based surveys). In determining the resistivity of a subsurface target formation it is also important to determine the resistivities of all the media (formations, and the water layer in a marine survey) above the target formation, that is, a model of the subsurface should be made from the top down. Therefore a range of offsets should be used in any particular survey that extends out to about four times the depth of each formation from the top of the subsurface down to the deepest target formation. The in-line field of a bipole electric field transmitter approximates that of an equivalent dipole at offsets of $r \geq 4\Delta x_s$.

In performing a practical electromagnetic survey, a plurality of spaced apart receivers is used, with each receiver bipole length, $\Delta x_r$, being substantially the same as the others and wherein the receiver bipoles are disposed generally end-to-end to provide substantially continuous subsurface survey coverage.

Consider a particular case for equation (1) in which $$i_{AB}(t) = I\Delta t \quad (2)$$

and in which $\Delta t$ (explained below) is very small compared with any time interval of interest in the impulse response of the earth, $g_{CD;AB}(t)$. The result can be expressed as:

$$v_{CD}(t) = I\Delta x_s \Delta x_r \Delta t g_{CD;AB}(t) + n_{CD}(t), \quad (3)$$

from which it can be determined that an instantaneous signal-to-noise ratio may be expressed as $$\frac{|I\Delta x_s \Delta x_r \Delta t g_{CD;AB}(t)|}{|n_{CD}(t)|}. \quad (4)$$

To maximize the signal-to-noise ratio, based on equation (4) it is desirable to maximize $I$, $\Delta x_s$, $\Delta x_r$, and $\Delta t$. As explained above, in the methods described in the above referenced publications a pseudo-random binary sequence (PRBS) is used as the transmitter current switching function. A PRBS of order n is a sequence of $N=2^n-1$ "samples" switched between two levels, for example, $+I$ and $-I$, at pseudo-random integer multiples of a fixed time (sample time) represented by $\Delta t$. The PRBS has a frequency spectrum with substantially uniform amplitude in the range $1/N\Delta t \leq f \leq 1/2\Delta t$. It can be shown that the transmitter current sample rate $1/\Delta t$ should decrease with offset with respect to the square thereof, i.e., as $1/r^2$. The foregoing transmitter current switching function is expected to maximize $\Delta t$. The deconvolution process compresses the PRBS into a single pulse of amplitude NI; that is, deconvolution increases the signal amplitude by a factor N.

Figure 2:
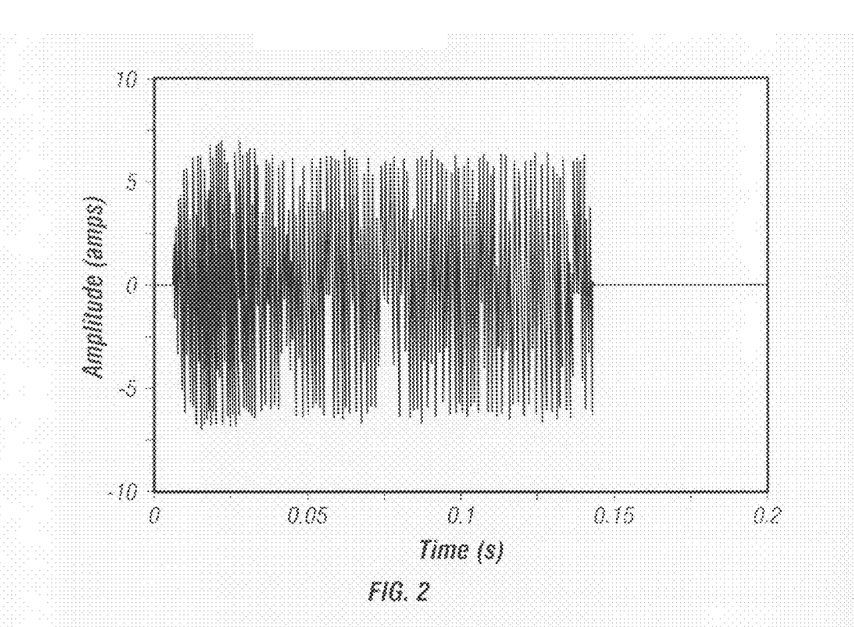
FIG. 2 shows a graph of transmitter current as measured for a pseudo-random binary sequence signal.
Figure 3:
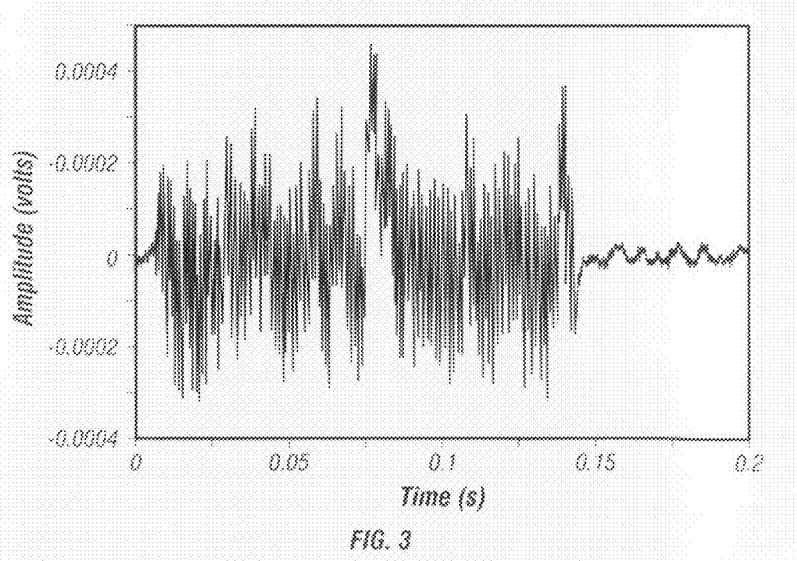
FIG. 3 shows a graph of voltage measured simultaneously between a pair of receiver electrodes in response to the transmitter current shown in FIG. 2.
Figure 4:
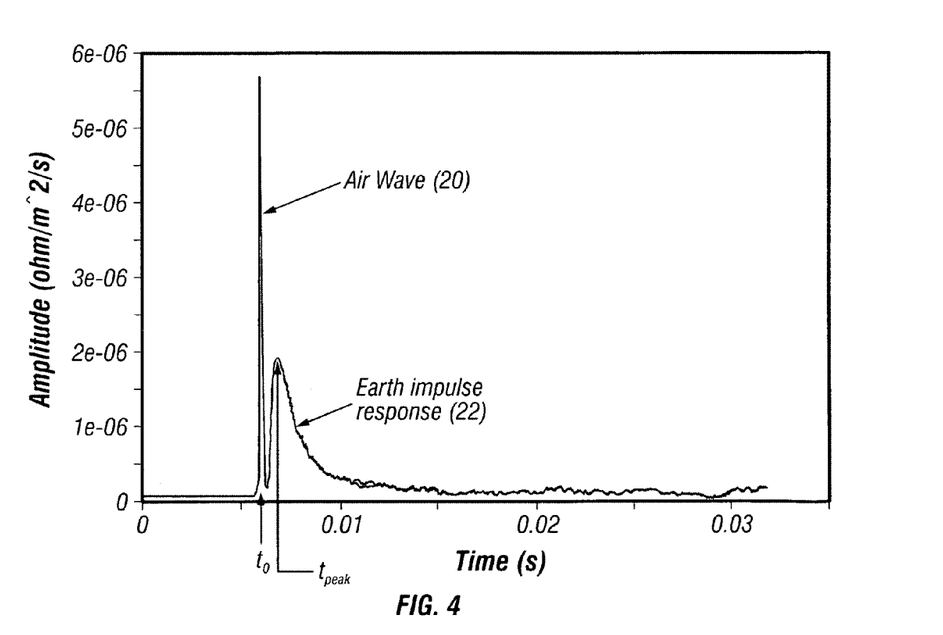
FIG. 4 shows a graph of impulse response recovered by deconvolving the voltage signal of FIG. 3 with the current signal of FIG. 2.

FIG. 2 shows a graph of an example of the measured transmitter current when a PBRS has been used to energize the transmitter (11 in FIG. 1). FIG. 3 shows the voltage measured simultaneously between a pair of receiver electrodes (e.g., C, D in FIG. 1) in response to the transmitter current example shown in FIG. 2. FIG. 4 shows the impulse response recovered by deconvolving the voltage signal of FIG. 3 with the current measurement of FIG. 2. The impulse response in FIG. 4 includes a component known as the "air wave" 20 that is generated by the interface between the air and the water top, and a component shown at 22 representing the response of the formations below the water bottom (16 in FIG. 1). Note that in the present example, which represents data acquired on land for the purpose of better illustrating the signal components of the impulse response, the duration of the impulse response is less than about 20 milliseconds, whereas the measured input current signal (FIG. 2) and measured output voltage signal (FIG. 3) are both much longer duration, e.g., about 140 milliseconds.

A technique for determining resistivities of the subsurface formations from all the determined earth impulse responses is known as "inversion" and one such technique is described in some detail in the Ziolkowski et al. (2007) publication cited above.

In the invention, electromagnetic survey acquisition of a plurality of different offset signals as well signals recorded above a plurality of areas in the subsurface may be performed by actuating two or more transmitters contemporaneously, while recording signals resulting from the actuation of the two or more transmitters.

Figure 5:
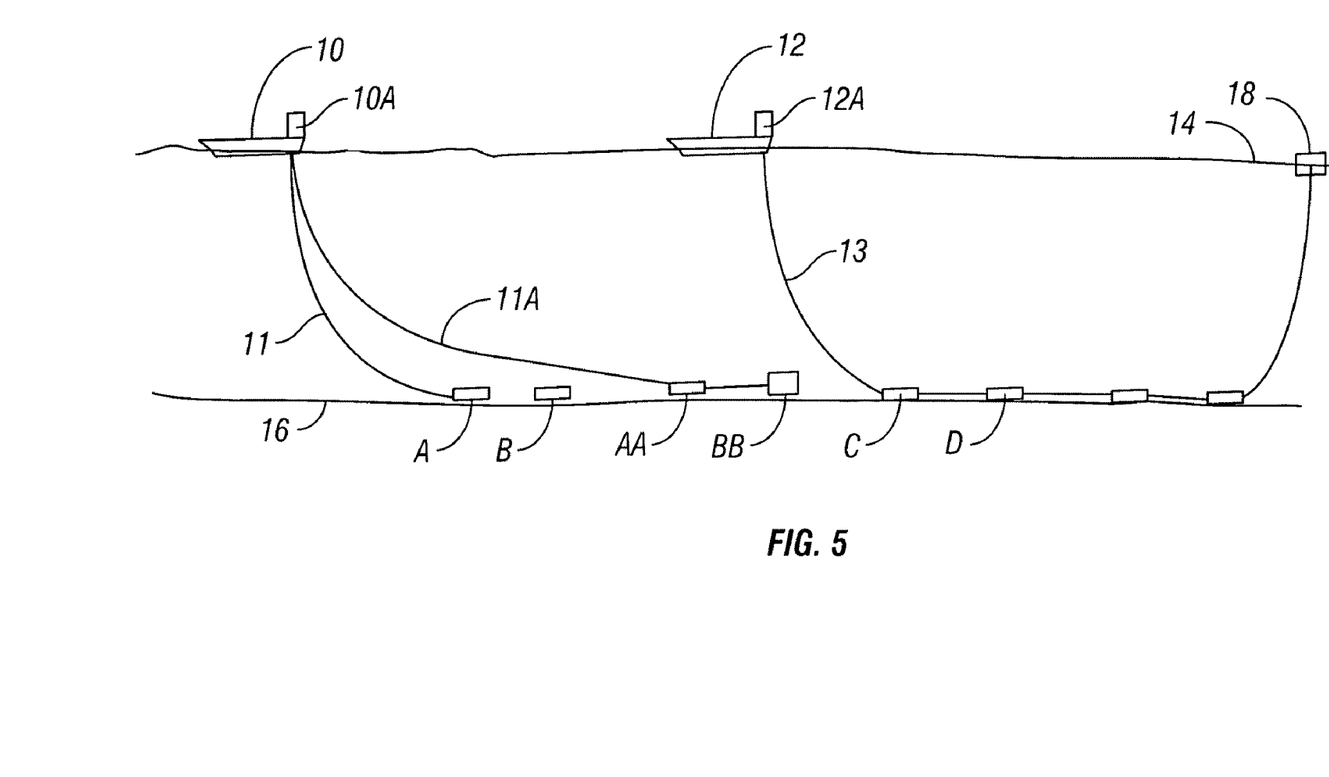
FIG. 5 shows two transmitters used with one receiver in an example of a method according to the invention.

FIG. 5 shows an example marine electromagnetic survey system that may be used with methods according to the invention. The example of FIG. 5 may include a receiver vessel 12 as in FIG. 1 with a receiver 13 deployed therefrom. A transmitter vessel 10 may deploy a transmitter as in FIG. 1. The transmitter vessel 10 in FIG. 5, however, may deploy at least one additional transmitter 11A. The at least one additional transmitter 11A may include two spaced apart electrodes AA, BB similar to those A, B on the transmitter 11, and may be deployed so as to have a different offset from the receiver 13. The at least one additional transmitter 11A may be deployed by a different vessel (not shown).

The transmitters 11, 11A in the present example have electrodes A, B, AA, BB typically spaced 200 m apart from each other and suspended about 2 m above the water bottom, and to which a PRBS switched electric current is applied. The current switching in the PBRS is by polarity reversal, between, for example, +700 Amperes and −700 Amperes. The transmitter sample rate may be varied for different offset ranges, for example, 200 Hz may be used for 800-1,800 m offset, 50 Hz may be used for 1,800-2,800 m offset, and 20 Hz may be used for 2,800-4,000 m offset.

Just as in the previous example shown in FIG. 1, each transmitter 11, 11A may be an electric field transmitter, for example, an electric bipole as shown, or may be a magnetic field transmitter such as a wire loop or coil. The receivers may be electric bipoles for measuring potential differences as shown, or may be wire loops or coils, or magnetometers for measuring magnetic fields and/or the time derivatives of magnetic fields.

The signal transmitted from each transmitter 11, 11A may be a transient signal, for example, a pseudo-random binary sequence (PRBS). In accordance with the invention, the signals generated by each transmitter 11, 11A are uncorrelated and may be substantially contemporaneously or even simultaneously transmitted to induce respective electromagnetic fields into the earth's subsurface. The transmitter signals are directly measured, as is the resultant response at each receiver.

The signals detected by the receiver are analyzed to determine the earth impulse response corresponding to each transmitter's signal. The earth impulse responses may be used to determine the spatial distribution of electrical resistivity in the subsurface, as explained above. A suitable analysis to determine the earth impulse response corresponding to each transmitter's signal is outlined below. The uncorrelated signals emitted by each of the two transmitters 11, 11A preferably have the following two properties: (1) each signal is easy to distinguish from a time-shifted version of itself; and (2) each signal is easy to distinguish from the other signal, including time-shifted versions thereof. Examples of signals that can be used are known to those of ordinary skill in the art, and are described, for example, in Sarwate, D. V., and Pursley, M. B., 1980, *Crosscorrelation properties of pseudorandom and related sequences*, Proceedings of the IEEE, 68, 593-619. Preferably, both transmitter signals are pseudo-random binary sequences. The transmitter signals may have cross correlation functions of substantially zero. The transmitted signal at each transmitter may be directly measured, for example, using a magnetometer or by direct measurement of the current in the transmitter circuit.

A method according to the invention for analysing a received electromagnetic signal that includes components from at least first and second known, uncorrelated electromagnetic transmitter signals transmitted contemporaneously from different electromagnetic transmitters through the earth includes determining the difference between the earth response to the first signal and the received signal (for example by subtracting the earth response to the first signal from the received signal), and processing the difference using the second transmitted signal to estimate the earth response to the second transmitted signal.

In some examples, more than two transmitters may be used, each generating a known signal that is substantially uncorrelated with the signal from any other transmitter. Where more than two known, uncorrelated electromagnetic signals are transmitted (e.g., using three or more transmitters), the method further includes determining a difference between the estimated earth response to the first and second signals and the received signal and processing that difference using another known transmitter signal to estimate the earth response to that transmitted signal.

Figure 6:
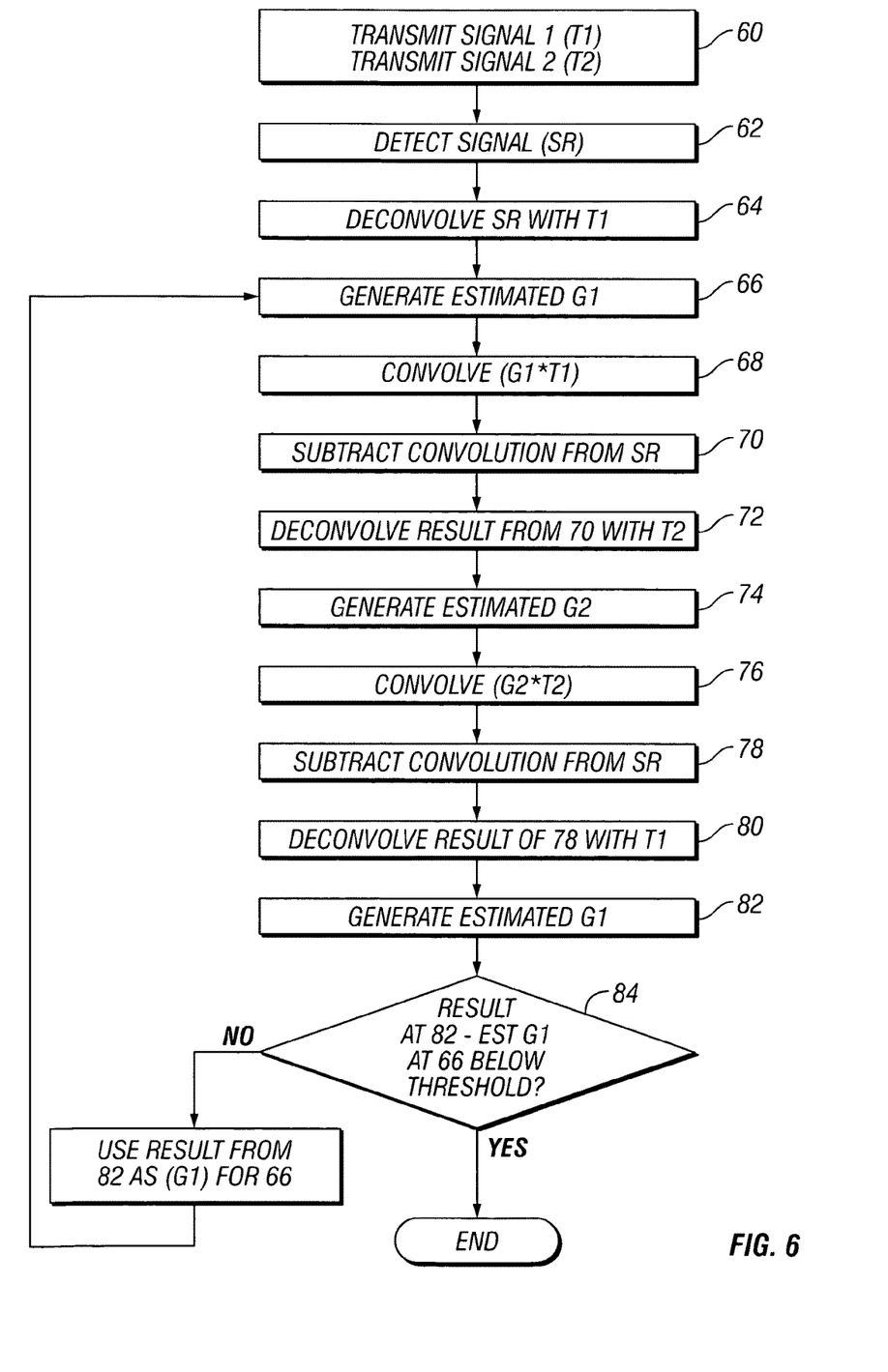
FIG. 6 shows a flow chart of one example implementation of the invention.

An example implementation is shown in a flow chart in FIG. 6. At 60, a first electromagnetic signal is transmitted by the first transmitter (e.g., 11 in FIG. 5). A second electromagnetic signal is transmitted by the second transmitter (e.g., 11A in FIG. 5). At 62, the signals resulting from both the first transmitter signal and the second transmitter signal are detected (e.g. by the receiver 13 in FIG. 5).

Processing the detected signal may include: (a) deconvolving the received signal using the first transmitter signal, shown at 64; (b) estimating the formation response to the first transmitter signal using the deconvolved received signal, shown at 66; (c) convolving the estimated formation response from (b) with the first transmitter signal, shown at 68; and (d) subtracting the result of the convolution performed in (c) from the received signal, as shown at 70 in FIG. 6.

Processing the result of the subtraction at 70 may include (e) deconvolving the result from 70 in FIG. 6 with the second transmitter signal, at 72, to produce an estimate of the formation response to the second transmitted signal, at 74.

Estimating the formation response to the first transmitter signal using the deconvolved received signal may include identifying a peak associated with the first transmitter signal and using the peak to determine the estimate.

The method may further include: (f) convolving the estimate of the formation response to the second transmitter signal with the second transmitter signal, as shown at 76; (g) subtracting the result at 76 from the received signal, as shown at 78; (h) deconvolving the result of (g) with the first transmitter signal as shown at 80, (i) estimating the formation response to the first transmitter signal using the result of (h) as shown at 82. At 84, the improved estimate of the formation response determined at 82 is compared with the estimate of formation response determined at 66. If the difference between the two estimates is below a selected threshold, then the process may terminate. If the difference exceeds the selected threshold, the process may continue by (j) using the estimate of (i) in (c), thus returning the process to 66 in FIG. 6. Steps (c) to (j) may be iteratively repeated until convergence is reached, meaning that the difference determined at 84 is below the selected threshold.

More than two signals may be simultaneously or contemporaneously transmitted and the method may include processing the received signal using each of the transmitted signals to determine the formation response.

Having explained the actions required to perform a method according to the invention the following is an explanation of the principle of such method. Let a first electromagnetic signal transmitter (or "source") be disposed at a position designated by $x_{s1}$ and let a second source be disposed at position designated by $x_{s2}$ Each transmitter or source emits separate and independent transmitter signals designated by $s(x_{s1},t)$ and $s(x_{s2},t)$. In the present example, the two transmitter signals are measured as explained above and so are known. There may be one or more electromagnetic receivers for detecting earth response, one of which is disposed at a position designated by $x_r$. The signal received at $x_r$, designated by $v(x_{s1},x_{s2},x_r,t)$, can be represented by the expression:

$$v(x_{s1},x_{s2},x_r,t)=s(x_{s1},t)*g(x_{s1},x_r,t)+s(x_{s2},t)*g(x_{s2},x_r,t)+n_1(x_r,t) \quad (5)$$

Equation (5) is the superposition of two different convolutions, plus noise. If the two source signals $s(x_{s1},t)$ and $s(x_{s2},t)$ are known, such as by measurement, the earth impulse response for each of the two transmitter signals, designated by $g(x_{s1},x_r,t)$ and $g(x_{s2},x_r,t)$ may be estimated from the received signal. In equation (5), $n_1(x_r,t)$ represents noise. An example technique for estimating the two earth responses is outlined below for the purposes of illustration.

Consider the situation in which $s(x_{s1},t)$ and $s(x_{s2},t)$ are orthogonal (uncorrelated) pseudo-random binary sequences having the same bandwidth. It is helpful, but not essential, if $s(x_{s1},t)$ and $s(x_{s2},t)$ have time durations significantly greater than either earth impulse response, $g(x_{s1},x_r,t)$ or $g(x_{s2},x_r,t)$. Let $g(x_{s1},x_r,t)$ be of duration $T_1$, $g(x_{s2},x_r,t)$ be of length $T_2$, and the receiver signal $v(x_{s1},x_{s2},x_r,t)$ be of duration $T_v$, which is substantially longer both than $T_1$ or $T_2$.

The first element of the technique to determine each earth impulse response is to deconvolve equation (5) for either $s(x_{s1},t)$ or $s(x_{s2},t)$. In practice, it is better to choose for the deconvolution the source that produces the larger contribution to the received signal, typically the source that is closer to the receiver. If the sources are equidistant from the receiver and have the same transmitted signal amplitude and bandwidth, then either source can be chosen. To facilitate the deconvolution, first, equation (5) may be transformed to the frequency domain using, for example, the Fourier transform, to provide the expression:

$$V(x_{s1},x_{s2},x_r,\omega)=S(x_{s1},\omega).G(x_{s1},x_r,\omega)+S(x_{s2},\omega).G(x_{s2},x_r,\omega)+N_1(x_r,\omega) \quad (6)$$

in which $\omega$ is angular frequency, the replacement of lower-case by upper-case letters denotes the change in domain from time domain to frequency domain, and the convolutions become multiplications. Dividing the foregoing by $S(x_{s1},\omega)$ results in the deconvolution being performed in the frequency domain. The result of the deconvolution may be expressed as:

$$\frac{V(x_{s1}, x_{s2}, x_r, \omega)}{S(x_{s1}, \omega)} = X_1(x_{s1}, x_{s2}, x_r, \omega) \quad (7)$$

$$= G(x_{s1}, x_r, \omega) + \frac{S(x_{s2}, \omega)}{S(x_{s1}, \omega)}.$$

$$G(x_{s2}, x_r, \omega) + \frac{N_1(x_r, \omega)}{S(x_{s1}, \omega)}$$

If $s(x_{s1},t)$ and $s(x_{s2},t)$ are each a PRBS, they each have constant amplitude independent of frequency. The ratio of their amplitude spectra is also independent of frequency, and is a constant value:

$$\left|\frac{S(x_{s2}, \omega)}{S(x_{s1}, \omega)}\right| = C \quad (8)$$

The phase spectra of both $s(x_{s1},t)$ and $s(x_{s2},t)$ are random, and the ratio of the phase spectra is the phase spectrum of $s(x_{s2},t)$ minus the phase spectrum of $s(x_{s1},t)$, which is also random. The foregoing frequency domain ratio of the first and second transmitted signals has a flat amplitude spectrum and a random phase spectrum. The foregoing phase spectrum in the time domain is white noise.

Transforming equation (7) back to the time domain yields the expression:

$$\begin{aligned} x_1(x_{s1}, x_{s2}, x_r, t) &= \delta(t) * g(x_{s1}, x_r, t) + w(x_{s1}, x_{s2}, t) * \\ & \quad g(x_{s2}, x_r, t) + n_1(x_{s1}, x_r, t) \\ &= g(x_{s1}, x_r, t) + w(x_{s1}, x_{s2}, t) * \\ & \quad g(x_{s2}, x_r, t) + n_1(x_{s1}, x_r, t), \end{aligned} \quad (9)$$

in which $w(x_{s1},x_{s2},t)$ represents the white noise.

On the right-hand side of equation (9), the first term is the convolution of the earth impulse response $g(x_{s1},x_r,t)$ for the first transmitter position with the impulse $\delta(t)$. That is, all the energy in the first transmitted signal $s(x_{s1},t)$ has been compressed into an impulse represented by $\delta(t)$. The second term is the convolution of the impulse response $g(x_{s2},x_r,t)$ for the second transmitter position with the white noise $w(x_{s1},x_{s2},t)$. The third term is the noise. The deconvolved data sequence $x_1(x_{s1},x_{s2},x_r,t)$, of length $T_v$, is two relatively long, superimposed noise sequences plus a short, high amplitude signal $g(x_{s1},x_r,t)$ of length $T_1$ at the beginning. The signal-to-noise ratio of this first part, $t \leq T_1$, is typically large, because of the large processing gain introduced by the deconvolution step. So this first part is a good estimate of the earth impulse response $g(x_{s1},x_r,t)$ to the first transmitter signal; that is:

$$x_1(x_{s1},x_{s2},x_r,t) = \hat{g}(x_{s1},x_r,t) \approx g(x_{s1},x_r,t), \, t \leq T_1 \quad (10)$$

Next, the above derived estimate of the impulse response of the earth to the first transmitter signal, $g(x_{s1},x_{s2},t)$, is convolved with the first transmitter signal, $s(x_{s1},t)$ and the result of the convolution is subtracted from the original signal measurement $v(x_{s1},x_{s2},x_r,t)$. The remainder, represented by $x_2(x_{s1},x_{s2},x_r,t)$ is very nearly equal to the convolution of the impulse response of the earth $g(x_{s2},x_r,t)$, with the second transmitted signal $s(x_{s2},t)$ plus uncorrelated noise, given by the expression:

$$\begin{aligned} x_2(x_{s1}, x_{s2}, x_r, t) &= v(x_{s1}, x_{s2}, x_r, t) - s(x_{s1}, t) * \hat{g}(x_{s1}, x_r, t) \\ &= [s(x_{s1}, t) * g(x_{s1}, x_r, t) - \\ & \quad s(x_{s1}, t) * \hat{g}(x_{s1}, x_r, t)] + \\ & \quad s(x_{s2}, t) * g(x_{s2}, x_r, t) + n_1(x_r, t) \\ &\approx s(x_{s2}, t) * g(x_{s2}, x_r, t) + n_1(x_r, t). \end{aligned} \quad (11)$$

$x_2(x_{s1},x_{s2},x_r,t)$ may now be deconvolved from $s(x_{s2},t)$ to obtain an estimate $\hat{g}(x_{s2},x_r,t)$, of $g(x_{s2},x_r,t)$, which lies in the time range $t \leq T_2$.

To improve the estimates of $g(x_{s1},x_r,t)$ and $g(x_{s2},x_r,t)$, the estimated impulse response for the second transmitter signal $\hat{g}(x_{s2},x_r,t)$ can be convolved with the second transmitter signal $s(x_{s2},t)$ and the result subtracted from the original measurement $v(x_{s1},x_{s2},x_r,t)$. The remainder $x_3(x_{s1},x_{s2},x_r,t)$ is very nearly equal to the convolution of the impulse response of the earth with the first transmitter signal $g(x_{s1},x_r,t)$ with the first transmitter signal $s(x_{s1},t)$ plus uncorrelated noise. Deconvolving $x_3(x_{s1},x_{s2},x_r,t)$ for $s(x_{s1},t)$ yields an improved estimate of $g(x_{s1},x_r,t)$ compared with that which was obtained in the initial deconvolution. The foregoing improved estimate may be used in the subsequent deconvolution for the second transmitter signal to provide an improved estimate of the earth impulse response to the second transmitter signal, $g(x_{s2},x_r,t)$. The foregoing iterative procedure can be repeated until there substantially is no change in the estimates of earth impulse response for the first and second transmitter signals. In practice, the procedure will normally converge in two or three iterations if the signal-to-noise ratio of the initial measurement of equation (4) is adequate. The degree to which the responses to the first and second transmitter signals may be separated from the receiver signal depends on the characteristics of the transmitter signals and the precision with which they are known. Once the earth response to each of the transmitter signals is determined, such earth responses can be used to estimate the resistivity distribution. The foregoing can be performed using any known techniques, for example, an inversion technique such as described in Ziolkowski, A., Hobbs, B. A., and Wright, D., 2007, *Multitransient electromagnetic demonstration survey in France*, Geophysics, 72, F197-F209 referenced above.

Because the transmitter signals are coded sequences and not impulses, the convolution of either source signal with the earth impulse response results in a signal that is longer than the earth impulse response. The deconvolution process for either transmitter signal compresses that source signal to a large impulse. The recovered earth impulse response, which is confined to a time window shorter than the whole received signal length, then stands up above the background, which is essentially a random noise. This makes it relatively easy to estimate that response. The iterative procedure improves the initial estimates.

The analysis described above can be implemented using any suitable software or hardware and in any computer-based system, for example a conventional general-purpose processor or any dedicated processor programmed or configured to process the received signals using the input signals in accordance with the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for electromagnetic exploration of subsurface formations below a body of water, comprising:
   imparting a first electromagnetic signal into the subsurface formations from a first location suspended above the bottom of the body of water;
   imparting a second electromagnetic signal into the formations from a second location substantially contemporaneously with imparting the first electromagnetic signal, the first and second electromagnetic signals substantially uncorrelated with each other;
   detecting a combined electromagnetic response of the formations to the first and second imparted electromagnetic signals at a third location; and
   determining a response of the formations to each of the first and the second imparted signals from the detected response, wherein determining formation response to the first electromagnetic signal comprises:

(a) deconvolving the detected signal using the first electromagnetic signal;
(b) estimating the formation response to the first electromagnetic signal using the deconvolved detected signal;
(c) convolving the estimated formation response from (b) with the first electromagnetic signal; and
(d) subtracting a result of the convolution of the estimated formation response with the first electromagnetic signal from the detected signal.

2. A method as claimed in claim 1 wherein the estimating the formation response to the first electromagnetic signal using the deconvolved detected signal includes identifying a peak associated with the first electromagnetic signal and using the peak to determine the estimate.

3. A method as claimed in claim 1 further comprising (e) deconvolving the result of (d) with the second electromagnetic signal to produce an estimate of formation response to the second electromagnetic signal.

4. A method as claimed in claim 3 further comprising:
(f) convolving the estimate of the formation response to the second electromagnetic signal with the second electromagnetic signal;
(g) determining a difference between the result of (f) and the detected signal;
(h) deconvolving the result of (g) with the first electromagnetic signal to produce an improved estimate of the formation response to the first electromagnetic signal; and
(j) using the improved estimate produced in (h) by (1) convolving the estimated formation response from (h) with the first electromagnetic signal, and (2) subtracting a result of the convolution of the estimated formation response from (h) with the first electromagnetic signal from the detected signal.

5. A method as claimed in claim 4 further comprising iteratively repeating (c) to (j) until convergence occurs.

6. A method for determining a formation response from a detected electromagnetic signal resulting from a first electromagnetic signal imparted into a subsurface earth formation at a first location and from a second electromagnetic signal imparted into the formation at a second location, the first and second signals being imparted substantially contemporaneously, the method comprising:

(a) deconvolving the detected signal using the first electromagnetic signal;
(b) estimating the formation response to the first electromagnetic signal using the deconvolved detected signal;
(c) convolving the estimated formation response from (b) with the first electromagnetic signal, and
(d) subtracting a result of the convolution of the estimated formation response with the first electromagnetic signal from the detected signal.

7. A method as claimed in claim 6 wherein the estimating the formation response to the first electromagnetic signal using the deconvolved detected signal includes identifying a peak associated with the first electromagnetic signal and using the peak to determine the estimate.

8. A method as claimed in claim 7 further comprising (e) deconvolving the result of (d) with the second electromagnetic signal to produce an estimate of formation response to the second electromagnetic signal.

9. A method as claimed in claim 8 further comprising:
(f) convolving the estimate of the formation response to the second electromagnetic signal with the second electromagnetic signal;
(g) determining a difference between the result of (f) and the detected signal;
(h) deconvolving the result of (g) with the first electromagnetic signal to produce an improved estimate of the formation response to the first electromagnetic signal, and
(j) using the improved estimate produced in (h) by convolving the estimated formation response from (h) with the first electromagnetic signal, and subtracting a result of the convolution of the estimated formation response from (h) with the first electromagnetic signal from the detected signal.

10. A method as claimed in claim 9 further comprising iteratively repeating (c) to (j) until convergence occurs.

11. A method as claimed in claim 6, wherein the first and second electromagnetic signals are substantially uncorrelated pseudo-random binary sequences.

12. A method as claimed in claim 6, wherein the first and second electromagnetic signals have a cross correlation function of substantially zero.

13. A method as claimed in claim 6 wherein the first and second imparted signals have overlapping bandwidths.

\* \* \* \* \*